(12) United States Patent
Vigoda et al.

(10) Patent No.: US 8,458,114 B2
(45) Date of Patent: Jun. 4, 2013

(54) ANALOG COMPUTATION USING NUMERICAL REPRESENTATIONS WITH UNCERTAINTY

(75) Inventors: Benjamin Vigoda, Winchester, MA (US); William Bradley, Somerville, MA (US); Shawn Hershey, Jamaica Plain, MA (US); Jeffrey Bernstein, Middleton, MA (US)

(73) Assignee: Analog Devices, Inc., Norwood, MA (US)

( * ) Notice: Subject to any disclaimer, the term of this patent is extended or adjusted under 35 U.S.C. 154(b) by 718 days.

(21) Appl. No.: 12/716,155

(22) Filed: Mar. 2, 2010

(65) Prior Publication Data

US 2010/0223225 A1  Sep. 2, 2010

Related U.S. Application Data

(60) Provisional application No. 61/156,729, filed on Mar. 2, 2009.

(51) Int. Cl.
*G06F 9/44* (2006.01)
*G06N 7/02* (2006.01)
*G06N 7/06* (2006.01)

(52) U.S. Cl.
USPC .......................................................... 706/52

(58) Field of Classification Search
USPC .......................................................... 706/52
See application file for complete search history.

(56) References Cited

U.S. PATENT DOCUMENTS

| | | | |
|---|---|---|---|
| 4,077,035 A | 2/1978 | Yee | |
| 4,399,426 A | 8/1983 | Tan | |
| 4,649,515 A | 3/1987 | Thompson | |
| 5,172,338 A | 12/1992 | Mehrotra et al. | |

(Continued)

FOREIGN PATENT DOCUMENTS

| EP | 0614157 | 10/1999 |
|---|---|---|
| EP | 1137001 | 9/2001 |

(Continued)

OTHER PUBLICATIONS

D'Mello, Design Approaches to Field-Programmable Analog Integrated Circuits, Analog Integrated Circuits and Signal Processing, 17(1-2), 1998.

(Continued)

*Primary Examiner* — Michael B Holmes
(74) *Attorney, Agent, or Firm* — Occhiuti Rohlicek & Tsao LLP

(57) ABSTRACT

Some general aspects relate to systems and methods of analog computation using numerical representation with uncertainty. For example, a specification of a group of variables is accepted, with each variable having a set of at least N possible values. The group of variables satisfies a set of one or more constraints, and each variable is specified as a decomposition into a group of constituents, with each constituent having a set of M (e.g., M<N) possible constituent values that can be determined based on the variable values. The method also includes forming a specification for configuring a computing device that implements a network representation of the constraints based on the specification of the group of variables. The network representation includes a first set of nodes corresponding to the groups of constituents, a second set of nodes corresponding to the set of constraints, and interconnections between the first and the second sets of nodes for passing continuous-valued data.

27 Claims, 5 Drawing Sheets

U.S. PATENT DOCUMENTS

| | | | |
|---|---|---|---|
| 5,235,335 | A | 8/1993 | Hester |
| 5,243,688 | A | 9/1993 | Pechanek |
| 5,745,382 | A | 4/1998 | Vilim |
| 5,959,871 | A | 9/1999 | Pierzchala |
| 6,054,945 | A | 4/2000 | Doyle |
| 6,094,368 | A | 7/2000 | Ching |
| 6,185,331 | B1 | 2/2001 | Shi |
| 6,212,652 | B1 | 4/2001 | Williams |
| 6,212,654 | B1 | 4/2001 | Lou |
| 6,279,133 | B1 | 8/2001 | Vafai |
| 6,282,559 | B1 | 8/2001 | Helfenstein |
| 6,339,546 | B1 | 1/2002 | Katayama |
| 6,414,541 | B1 | 7/2002 | Arvidsson |
| 6,510,229 | B1 | 1/2003 | Geile |
| 6,584,486 | B1 | 6/2003 | Helfenstein |
| 6,633,856 | B2 | 10/2003 | Richardson |
| 6,714,462 | B2 | 3/2004 | Pan |
| 6,744,299 | B2 | 6/2004 | Geysen |
| 6,762,624 | B2 | 7/2004 | Lai |
| 6,763,340 | B1 | 7/2004 | Burns |
| 6,771,197 | B1 | 8/2004 | Yedidia |
| 6,938,196 | B2 | 8/2005 | Richardson |
| 6,957,375 | B2 | 10/2005 | Richardson |
| 6,990,018 | B2 | 1/2006 | Tanaka |
| 7,071,846 | B2 | 7/2006 | Moerz |
| 7,199,740 | B1 | 4/2007 | Ferguson, Jr. |
| 7,203,887 | B2 | 4/2007 | Eroz |
| 7,209,867 | B2 * | 4/2007 | Vigoda et al. ............... 702/189 |
| 7,292,069 | B2 | 11/2007 | Hannah |
| 7,373,585 | B2 | 5/2008 | Yedidia |
| 7,388,781 | B2 | 6/2008 | Litsyn |
| 7,394,704 | B2 | 7/2008 | Tanaka |
| 7,418,468 | B2 | 8/2008 | Winstead |
| 7,437,631 | B2 | 10/2008 | Auclair |
| 7,451,174 | B2 | 11/2008 | Loeliger |
| 7,533,328 | B2 | 5/2009 | Alrod |
| 7,539,721 | B2 | 5/2009 | Belveze et al. |
| 7,616,481 | B2 | 11/2009 | Mokhlesi |
| 7,669,106 | B1 | 2/2010 | Farjadrad |
| 7,716,413 | B2 | 5/2010 | Lasser |
| 7,716,415 | B2 | 5/2010 | Sharon |
| 7,719,889 | B2 | 5/2010 | Lin |
| 7,769,798 | B2 | 8/2010 | Banihashemi |
| 7,804,434 | B2 | 9/2010 | Stoutjesdijk |
| 7,814,402 | B2 | 10/2010 | Gaudet |
| 7,818,653 | B2 | 10/2010 | Brandman |
| 7,860,687 | B2 * | 12/2010 | Vigoda et al. ............... 702/189 |
| 7,975,223 | B2 * | 7/2011 | Plumley et al. ............... 715/255 |
| 8,107,306 | B2 * | 1/2012 | Vigoda et al. ............... 365/191 |
| 8,115,513 | B2 * | 2/2012 | Vigoda et al. ............... 326/52 |
| 8,179,713 | B2 * | 5/2012 | Kanzawa et al. ............. 365/148 |
| 8,234,387 | B2 * | 7/2012 | Bradley et al. ............... 709/229 |
| 2003/0021149 | A1 | 1/2003 | So |
| 2003/0217323 | A1 | 11/2003 | Guterman |
| 2004/0030414 | A1 | 2/2004 | Koza |
| 2004/0136472 | A1 | 7/2004 | Vigoda |
| 2005/0128807 | A1 | 6/2005 | Chen |
| 2005/0165879 | A1 | 7/2005 | Nikitin |
| 2005/0240647 | A1 | 10/2005 | Banihashemi |
| 2006/0026224 | A1 | 2/2006 | Merkli |
| 2006/0114814 | A1 | 6/2006 | Kasami |
| 2007/0086239 | A1 | 4/2007 | Litsyn |
| 2007/0237006 | A1 | 10/2007 | Murin |
| 2007/0245214 | A1 | 10/2007 | Ramamoorthy |
| 2007/0250550 | A1 | 10/2007 | Berninger |
| 2008/0048781 | A1 | 2/2008 | Wagner |
| 2008/0065573 | A1 | 3/2008 | Macready |
| 2008/0077839 | A1 | 3/2008 | Gross |
| 2008/0082897 | A1 | 4/2008 | Brandman |
| 2008/0092014 | A1 | 4/2008 | Brandman |
| 2008/0092015 | A1 | 4/2008 | Brandman |
| 2008/0092026 | A1 | 4/2008 | Brandman |
| 2008/0109702 | A1 | 5/2008 | Brandman |
| 2008/0109703 | A1 | 5/2008 | Brandman |
| 2008/0123419 | A1 | 5/2008 | Brandman |
| 2008/0123420 | A1 | 5/2008 | Brandman |
| 2008/0151617 | A1 | 6/2008 | Alrod |
| 2008/0174460 | A1 | 7/2008 | Vigoda et al. |
| 2008/0195913 | A1 | 8/2008 | Bates |
| 2008/0244162 | A1 | 10/2008 | Mokhlesi |
| 2008/0244360 | A1 | 10/2008 | Mokhlesi |
| 2008/0256343 | A1 | 10/2008 | Gross |
| 2008/0263266 | A1 | 10/2008 | Sharon |
| 2008/0285688 | A1 | 11/2008 | Arzel |
| 2008/0294970 | A1 | 11/2008 | Gross |
| 2008/0307292 | A1 | 12/2008 | Gaudet |
| 2009/0002066 | A1 | 1/2009 | Lee |
| 2009/0100313 | A1 | 4/2009 | Gross |
| 2009/0144218 | A1 | 6/2009 | Bonawitz |
| 2009/0228238 | A1 | 9/2009 | Mansinghka |
| 2010/0017676 | A1 | 1/2010 | Gross |
| 2010/0033228 | A1 | 2/2010 | Gershenfeld |
| 2010/0088575 | A1 | 4/2010 | Sharon |
| 2010/0165738 | A1 | 7/2010 | Cernea |
| 2010/0174845 | A1 | 7/2010 | Gorobets |
| 2010/0198898 | A1 | 8/2010 | Pan |
| 2010/0207644 | A1 | 8/2010 | Nestler |
| 2010/0220514 | A1 | 9/2010 | Vigoda |
| 2010/0223225 | A1 | 9/2010 | Vigoda |
| 2010/0225419 | A1 | 9/2010 | Pan |
| 2010/0246287 | A1 | 9/2010 | Vigoda |
| 2010/0246289 | A1 | 9/2010 | Vigoda |
| 2010/0281089 | A1 | 11/2010 | Vigoda |
| 2010/0301899 | A1 | 12/2010 | Vigoda |
| 2010/0306150 | A1 | 12/2010 | Reynolds |
| 2010/0306164 | A1 | 12/2010 | Reynolds |

FOREIGN PATENT DOCUMENTS

| | | |
|---|---|---|
| EP | 0802540 | 6/2004 |
| KR | 1019980022518 | 7/1998 |
| WO | WO0041507 | 7/2000 |
| WO | WO2007133963 | 2/2008 |
| WO | WO2008042593 | 4/2008 |
| WO | WO2008057820 | 5/2008 |
| WO | WO2008057822 | 5/2008 |
| WO | WO2008042598 | 6/2008 |
| WO | WO2008121577 | 10/2008 |
| WO | WO2008129534 | 10/2008 |
| WO | WO2009137227 | 3/2010 |
| WO | WO2010101933 | 9/2010 |
| WO | WO2010101937 | 9/2010 |
| WO | WO2010101941 | 9/2010 |
| WO | WO2010101944 | 9/2010 |
| WO | WO2010111589 | 9/2010 |

OTHER PUBLICATIONS

Eguchi, Simple Design of a Discrete-Time Chaos Circuit Realizing a Tent Map, IEICE Trans. Electron. vol. E83-C(5), May 2000.

Gross, Stochastic Implementation of LDPC Decoders, Signals, Systems and Thirty-Ninth Asilomar Conference 2005.

Hagenauer, A Circuit-Based Interpretation of Analog MAP Decoding with Binary Trellises, Proc. 3rd ITG Conference Source and Channel Coding, Munchen, 2000.

Hagenauer, Analog Decoders and Receivers for High Speed Applications, Proc. of 2002 Int. Zurich Sem. on Broadband Comm, 2002.

Haley, An Analog LDPC Codec Core, Proc. Int. Symp. On Turbo Codes and Related Topics, 2003.

Kschischang, Factor Graphs and the Sum-Product Algorithm, IEEE Trans. Info. Theory, 47(2), 2001.

LeCun, Loss Functions for Discriminative Training of Energy Based Models, In Proc. of the 10-th International Workshop on Artificial Intelligence and Statistics, 2005.

Loeliger, Decoding in Analog VLSI, IEEE Communications Magazine, pp. 99-101, Apr. 1999.

Loeliger, Probability Propagation and Decoding in Analog VLSI, IEEE Transactions on Information Theory, 2001.

Loeliger, Analog Decoding and Beyond, ITW2001, 2pgs., Sep. 2001.

Loeliger, Some Remarks on Factor Graphs, Brest 2003.

Loeliger, An Introduction to Factor Graphs, IEEE Signal Processing Magazine, pp. 28-41, Jan. 2004.

Luckenbill, Building Bayesian Networks with Analog Subthreshold CMOS Circuits, Yale University, 2002.

Lustenberger, on the Design of Analog VLSI Iterative Decoders, ETH No. 13879, Zurich, 2000.

Mansinghka, Stochastic Digital Circuits for Probabilistic Inference, MIT, Cambridge, Nov. 2008.
Mansinghka, Natively Probabilistic Computation, MIT Ph.D. 2009.
Martinez, Discrete Time Filters, Wiley 1999.
Nguyen, A 0.8V CMOS Analog Decoder for an (8,4,4) Extended Hamming Code, Proceedings of the 2004 International Symposium on Circuits and Systems, 2004.
Rapley, Stochastic Iterative Decoding on Factor Graphs, Proc. 3rd Int. Symp. on Turbo Codes and Related Topics, pp. 507-510, 2003.
Rivet, A 65nm CMOS RF Front End Dedicated to Software Radio in Modile Terminals, Proc. SDR '08.
Schaefer, Analog Rotating Ring Decoder for an LDPC Convolutional Code, ITW2003, Paris, France, Mar. 31-Apr. 4, 2003.
Sequin, Analogue 16-QAM demodulator, Electronics Letters vol. 40, No. 18, 2004.
Stan, Analog Turbo Decoder Implemented in SiGe BiCMOS Technology, U. of Virginia, Dec. 15, 2002.
Tehrani, Stochastic Decoding of LDPC Codes, IEEE Communications Letters 10(10) Oct. 2006.
Tehrani, Survey of Stochastic Computation on Factor Graphs, ISMVL '07 Proceedings of the 37th International Symposium on Multiple-Valued Logic 2007.
Tehrani, Tracking Forecast Memories in Stochastic Decoders, IEEE ICASSP 2009.
Vigoda, A Nonlinear Dynamic System for Spread Spectrum Code Acquisition, MIT M.S. Thesis, Aug. 1999.
Vigoda, Analog Logic: Continuous-Time Analog Circuit for Statistical Signal Processing, MIT Ph. D. Thesis, Sep. 2003.
Vigoda, Synchronization of Pseudorandom Signals by Forward-Only Message Passing With Application to Electronic Circuits, IEEE Trans. Info. Theory, Aug. 2006.
Wang, Reduced Latency Iterative Decoding of LDPC Codes, MERL TR2005-103, 2005.
Winstead, Analog MAP Decoder for (8,4) Hamming Code in Sub-threshold CMOS, ISIT 2001.
Winstead, Analog Iterative Error Control Decoders, U. Alberta, Ph.D. Thesis, 2005.
Winstead, Analog Soft Decoding for Multi-Level Memories, Proc. IEEE Int. Symp. On Multiple-Value Logic (ISMVL'05).
Winstead, Stochastic Iterative Decoders, International Symposium on Information Theory 2005.
International Search Report for PCT/US2010/25940, Apr. 15, 2010.

* cited by examiner

ANALOG COMPUTATION USING NUMERICAL REPRESENTATIONS WITH UNCERTAINTY

CROSS-REFERENCE TO RELATED APPLICATIONS

This application claims the benefit of U.S. Provisional Application No. 61/156,729, titled "Analog Computation Using Soft Bytes," filed Mar. 2, 2009.

This application is also related to U.S. Provisional Application No. 61/156,792, titled "Belief Propagation Processor," filed Mar. 2, 2009, and U.S. Provisional Application No. 61/156,794, titled "Circuits for Soft Logical Functions," filed Mar. 2, 2009. The content of the above three applications is incorporated herein by reference.

STATEMENT AS TO FEDERALLY SPONSORED RESEARCH

This invention was made with government support under FA8750-07-C-0231 awarded by the Defense Advanced Research Projects Agency (DARPA). The government may have certain rights in this invention.

BACKGROUND

This application relates to analog computation using numerical representations with uncertainty, for example, as represented by soft bytes.

Statistical inference can involve manipulation of quantities that represent uncertainty in numerical values. Statistical inference can make use of statistics to draw inferences based on incomplete or inaccurate information. Statistical inference problems can be found in many application areas—from opinion polling to medical research to telecommunications systems. The field of statistical inference encompasses a wide variety of techniques for performing this task.

In some applications, statistical inference problems involve extracting information from a measurement of data that has been corrupted in some way. For example, a wireless receiver typically receives one or more radio signals that have been corrupted by noise, interference, and/or reflections. Statistical inference techniques can be used to attempt to extract the original transmitted information from the corrupted signal that was received.

In statistical inference, the language of probability is often used to quantitatively describe the likelihood that a particular condition is true. The meaning of these probabilities can be interpreted in different ways, although these interpretations are sometimes interchangeable. For example, very generally, a probability can be interpreted either as the degree of confidence that a condition is true, or alternatively as the fraction of times the condition will be true among a large number of identical experiments. Probabilities can be represented in the linear domain, for example, as real numbers from 0 to 1, where 1 is interpreted as complete confidence that the condition is true, and 0 is interpreted as complete confident that the condition will not occur. Probabilities can also be represented in the logarithmic domain, for example, using log likelihood ratios (or LLRs) representing the log of the ratio of the linear probabilities (the log odds). In some examples, the LLR of a binary variable x is defined as the logarithm of the ratio of the probability of x being 1 and the probability of x being 0, i.e., $$LLR(x) = \log\left(\frac{p(x=1)}{p(x=0)}\right).$$

In LLR representations, complete certainty of a condition being true is represented by $+\infty$, complete certainty of a condition being false is represented by $-\infty$, and complete uncertainty is represented by a value of 0.

Examples of techniques for solving statistical inference problems or for generating approximate solutions to statistical inference problems include belief propagation, which exploits the dependency (or the lack of dependency) between variables that can be translated into network elements. Some forms of belief propagation operate by passing messages between nodes in a factor graph that represents the system model, where each message represents a summary of the information known by that node through its connections to other nodes.

SUMMARY

Observing the fact that "soft"-statistical data is often analog in nature, i.e., represented by real values in an interval, it is possible to implement a belief propagation algorithm, or more generally, a statistical inference algorithm, using analog electrical circuits. Since only one analog signal is needed to represent a unit of statistical data rather that multiple signals for different bits of the digital signal representing the same data, the savings in hardware and power dissipation can be significant. Further, in some cases, analog computation can be faster than digital computation, especially for computationally intensive processing tasks.

One general aspect of the invention relates to a method of computation using numerical representation with uncertainty. The method includes accepting a specification of a group of variables, each variable having a set of at least N possible values. The group of variables satisfies a set of one or more constraints, and each variable is specified as a decomposition into a group of constituents, with each constituent having a set of M (e.g., M<N) possible constituent values that can be determined based on the variable values. The method also includes forming a specification for configuring a computing device that implements a network representation of the constraints based on the specification of the group of variables. The network representation includes a first set of nodes corresponding to the groups of constituents, a second set of nodes corresponding to the set of constraints, and interconnections between the first and the second sets of nodes for passing continuous-valued data.

The computing device configured according to said specification is operable to accept a first set of quantities each characterizing a degree of association of one constituent of one of the group of variables with one of the M possible constituent values; and determine a second set of quantities each characterizing a degree of association of one constituent of one of the group of variables with one of the M possible constituent values by passing the first set of quantities and intermediate data along the interconnections in the network representation.

Embodiments may include one or more of the following features.

The specification for the computing device may include an analog circuit specification. The analog circuit specification may include a discrete-time analog circuit specification. In some examples, the specification for the computing device includes software instructions for execution on a processor.

The set of constraints on the group of variables may include a set of arithmetic constraints, a set of logical constraints, or a combination of both.

In some embodiments, the specification of the group of variables represents a compressed representation of a first specification of the variables. The specification of the group of variables may be formed based on the first specification of the variables. This first specification may include a probability distribution representation of the variables, which may be a continuous or a discrete probability distribution, or a probability distribution function of the variables.

In some embodiments, the specification of the variables is formed by applying binary decomposition to the probability distribution representation of the variables. In some other embodiments, it is formed by applying the Fourier transform to the probability distribution representation of the variables.

In some embodiments, the probability distribution representation of the variables includes quantities characterizing a degree of association of each one of at least some of the variables with the one or more of the at least N possible values.

The degree of association of one constituent of a variable with one of the M possible constituent values may be represented in the probability domain, or alternatively, be represented in the logarithmic domain.

Another general aspect of the invention relates to a method including accepting a first set of quantities, each quantity being associated with one of M possible constituent values of a constituent of one of a group of input variables, each variable having a set of at least N possible values. Signals representing the first set of quantities are provided to computing circuitry implementing a network representation of a set of constraints on the input variables. The network representation includes a first set of nodes each corresponding to one of a group of constituents of a respective input variable, a second set of nodes corresponding to the set of constraints, and interconnections between the first and the second sets of nodes for passing continuous-valued data. The method also includes accepting, from the computing circuitry, signals representing a second set of quantities, each associated with one of M possible constituent values of a constituent of one input variable.

Embodiments of this aspect may include one or more of the following features.

The method also includes determining the first set of quantities from a first specification of the group of input variables, wherein the first specification includes quantities characterizing a degree of association of each of at least some input variables with a different one of the at least N possible values.

According to the signals representing the second quantities, a set of output is generated, with each output signal representing a degree of association of one of the group of input variables with a corresponding one of the at least N possible values.

In some embodiments, the computing circuitry includes analog circuits, which may include a clocked analog circuit. The clocked analog circuit includes soft logic gates for processing continuous-valued signals. The soft logic gates include one or more of soft Equal gates, soft XOR gates, soft AND gates, soft OR gates.

In some embodiments, the computing circuitry includes a processor configured by software instructions.

Another general aspect of the invention includes a computing device having computing circuitry for applying a network representation of a set of constraints on a group of input variables, each input variable having a set of at least N possible values. The network representation includes a first set of nodes each corresponding to one of a group of constituents of a respective input variable, a second set of nodes corresponding to the set of constraints, and interconnections between the first and the second sets of nodes for passing data. The computing device also includes an input processor for forming signals representing a first set of quantities, each quantity being associated with one of M possible constituent values of a constituent of one input variable, and for providing the formed signals to the computing circuitry. The computing device further includes an output processor for accepting signals generated by the computing circuitry representing a second set of quantities, each quantity being associated with one of the M possible constituent values of a constituent of one input variable.

Embodiments may include one or more of the following features.

The interconnections between the first and the second sets of nodes may pass continuous-valued data, or alternatively, quantized and/or digitized data.

In some embodiments, the computing circuitry is configured according to the network representation. In some other embodiments, the computing circuitry is configurable according to the network representation.

The computing circuitry is operable to accept a specification of the network representation of the set of constraints; and configure the circuitry to implement the network representation of the set of constraints according to the specification of the network representation.

Some embodiments of the various aspects may include one or more of the following advantages.

In some applications, there are gains to be had from optimizing computing systems for probabilistic inference instead of for logical inference. Designing probabilistic machinery may result in significant performance improvement (e.g., increase in speed and/or reduction in power consumption) in probabilistic computations as compared to a conventional digital machines.

In this document, signals representing "a degree of an association" include signals that can represent a non-absolute measure, or a measure that is different from a mere binary decision of absolute association (true) or absolute non-association (false). Such signals may be continuous-valued signals, for instance, that can have levels corresponding to numerical values within the range of (0, 1) (non-inclusive) as well as extreme values 0 or 1, or be signals that have levels corresponding to a gradation of a range of numerical values that results in multiple quantized progressions. In some implementations, the degree of an association is presented by the signal as a probability representation in a linear domain (e.g., linear probabilities), a probability representations in a logarithmic domain (e.g., log odds, log likelihood ratios), or representations of certainty or likelihood that are not strictly probabilistic.

Other features and advantages of the invention are apparent from the following description, and from the claims.

DETAILED DESCRIPTION

1 Overview

Figure 1A:
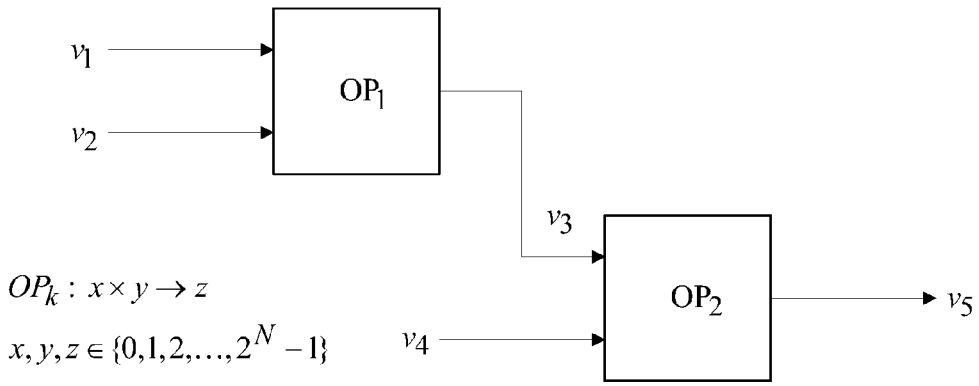
FIGS. 1A-1C illustrate a technique for constructing a soft processor that is configured to process the probabilistic information of a set of multi-state variables.

Statistical inference problems are commonly found in a wide range of application areas, including telecommunications, speech and language processing, image processing, and data analysis. Some traditional approaches to solving statistical inference problems use a network of digital circuit components (e.g., logic gates) to implement belief propagation algorithms that operate by passing messages along the connections of those components. "Soft" information (i.e., information representing uncertainty) contained in each message is represented by a digital signal that represents multiple bit numbers, with each bit number being transmitted, for example, via a separate bit line.

An alternative approach to implementing belief propagation algorithms uses analog electrical circuits, in which case soft information representing a single value with uncertainty can be represented by a single analog signal (e.g., a voltage or a current-encoded signal). Some designs of analog circuits of soft logical functions (e.g., soft Equals, soft XOR, and soft AND gates) have been shown to be able to achieve a substantial reduction in power consumption and silicon area when compared with their digital counterparts.

Some examples of analog circuits that operate on probabilities of binary variables are described, for example, in U.S. Provisional Application No. 61/156,794, titled "Circuits for Soft Logical Functions," filed Mar. 2, 2009. In some of these examples, each variable assumes two possible states, "0" and "1," and the probabilities of one or more variables being at state "0" or "1" can be processed to infer the state of other variables. Exemplary use of such analog circuits in constructing analog belief propagation processor is discussed, for example, in U.S. Provisional Application No. 61/156,792, titled "Belief Propagation Processor," filed Mar. 2, 2009.

The first part of the following description extends the design and application of statistical inference techniques in the analog domain to apply to systems having variables that can take any finite (and possibly large) number of states.

For example, assume that a system includes at least two variables x and y, with x having N number of possible states and y having M number of possible states, where both N and M are greater than or equal to 2. The probability distribution of variable x may be represented as a vector of probabilities with one element corresponding to each possible state, i.e., $p_x=[p(x=0), p(x=1), p(x=2), \ldots, p(x=N-1)]$, with $p(x=0)$ representing the probability of x being at state "0." Similarly, the probability of variable y may be represented as $p_y=[p(y=0), p(y=1), p(y=2), \ldots, p(y=M-1)]$.

One way to construct a soft processor that implements a function of $p_x$ and $p_y$ uses some of the techniques described in the above-mentioned patent applications, for example, by representing each element of the probability distributions $p_x$ and $p_y$ using a respective analog signal and designing circuit components that perform the corresponding arithmetic operations on the analog signals. As a result, a soft processor operating on $p_x$ and $p_y$ may have a complexity on the order of M·N, and thus the logic may grow quadratically in the number of variable states. Such an implementation may not always be desirable, especially if N and M become very large.

Another way to construct the soft processor attempts to form a "compressed" representation of the probability distributions of m-ary (m>2) variables, and to design circuit components that operate on this compressed representation instead of directly on the original probability distributions. In some examples, the compressed representation of the original probability distribution can be referred to a set of moments, as will be described further below. Preferably, the compressed representation can use a reduced amount of data to sufficiently describe the original distribution of variables with reasonable fidelity (e.g., without throwing out a substantial amount of essential information), thereby reducing the amount of resource requirements for performing the operations. An analogy in the digital domain would be to use a small number of binary bits to represent a variable with a very wide range of discrete values, and then perform bit operations on the binary bits which, in some examples, will only use $\log_2$ as many resources as required in representing the original variable.

Figure 1B:
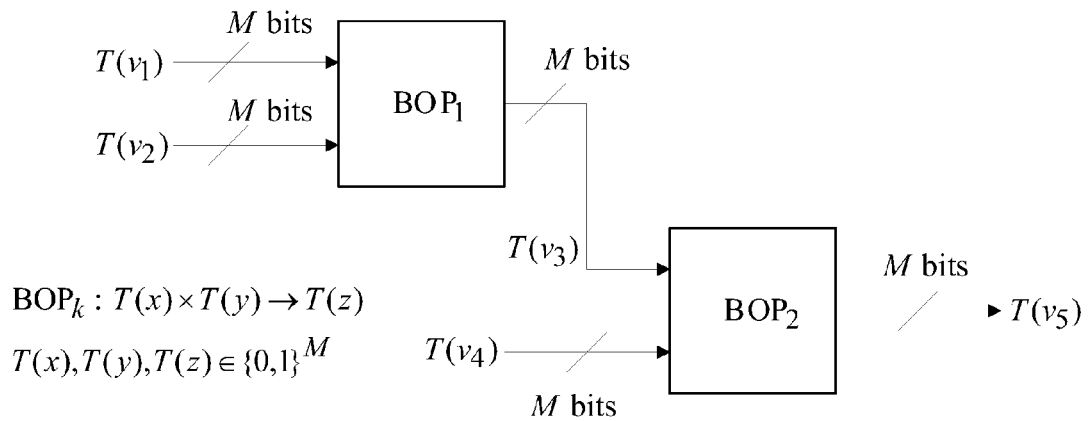
Figure 1C:
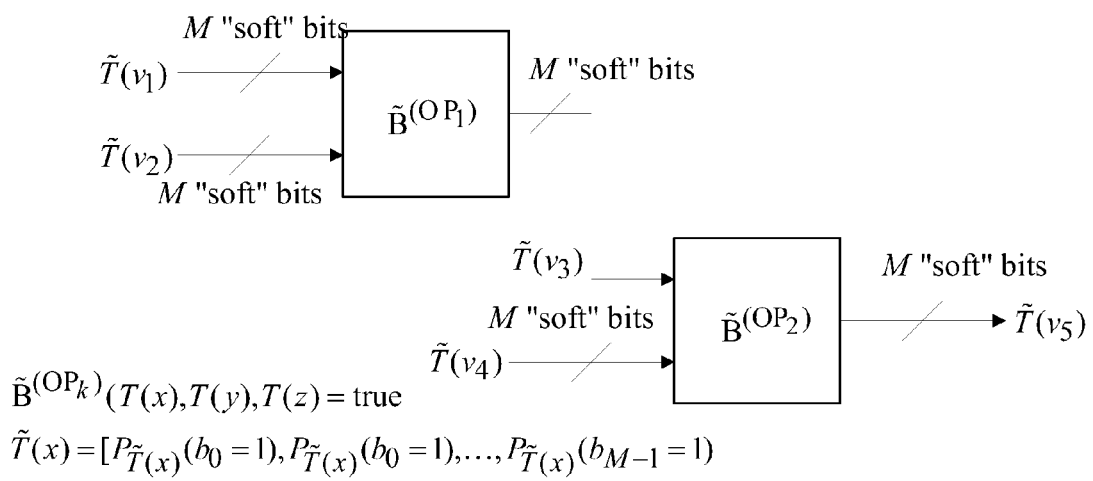

FIGS. 1A-1C illustrate one general approach for designing a soft processor that processes the soft information of a set of variables having a finite number of possible states. In this example, assume each variable has $2^N$ number of states (this number is selected only for the purpose of illustration). To facilitate discussions, one process to form the compressed representation of the probability distributions of these multi-state variables and to configure the corresponding circuit components operating on these compressed representations proceeds by adapting the general framework of a digital processor that operates on the same variables, as described in detail below.

Here, for a traditional digital processor that is configured to process the set of $2^N$-state variables, each operation $OP_k$ on three variables x, y, z can be described as: $OP_k$: x×y→z, where each variable can be in a state belonging to the set of $\{0, 1, \ldots, 2^N-1\}$.

Next, apply a transformation T to convert each variable of $2^N$ states into a transformed variable that can be represented as a string of M number of binary bits, or in other words, as a binary variable of length M (which may or may not be equal to N). Each operation $OP_k$ can then be translated into a corresponding binary-value operation $BOP_k$ that operates on the transformed variables, defined as:

$BOP_k$: T(x)×T(y)→T(z), where each transformed variable such as T(x) is defined as $T(x) \in \{0,1\}^M$. Here, T(x) can be processed in the system as a string of M bits $b_0, b_1, \ldots, b_{M-1}$, where M is typically smaller than $2^N$. In some examples where transformation T applies binary decoding to variable x, the resulting T(x) has a length M equal to N. In other examples, M can be either greater or smaller than N.

For each binary-value operation $BOP_k$, there may exist a set of Boolean constraints $B^{(OP_k)}$ that the three binary variables T(x), T(y), T(z) satisfy. This condition can be described as $B^{(OP_k)}(T(x),T(y),T(z))$=true.

With T(x),T(y),T(z) providing a transformed representation of the original variables x, y, z, the "soft" values (e.g., the probabilistic information) of T(x), T(y), T(z), denoted as $\tilde{T}(x),\tilde{T}(y),\tilde{T}(z)$, provide a transformed (and possibly compressed) representation of the original probability distribution (continuous or discrete) or the probability distribution function of the variables x, y, z.

To build a soft processor that can operate on $\tilde{T}(x),\tilde{T}(y),\tilde{T}(z)$, the set of Boolean constraints $B^{(OP_k)}$ is transformed into a network of inter-connected nodes (e.g., based on a factor graph representation), where each node corresponds to a soft logical function of the information received at the node. In the case of a factor graph-based network representation, the soft processor can be formed based on a network of variable nodes and check nodes where continuous-valued data is passed between the nodes. A circuit representing such a network can be formed using analog circuit components (e.g., soft logic gates), as described in the above-mentioned patent applications. Accordingly, soft values of the transformed input variables $\tilde{T}(x),\tilde{T}(y)$ can be processed to obtain the soft values of the transformed output variable $\tilde{T}(z)$, where $\tilde{T}(x)$ is a vector representing the probability distribution of the transformed variable $T(x)$, defined as $\tilde{T}(x)=[P_{\tilde{T}(x)}(b_0=1), P_{\tilde{T}(x)}(b_1=1), \ldots, P_{\tilde{T}(x)}(b_{M-1}=1)]$, and each element of the $\tilde{T}(x)$ vector can be referred to as a moment.

Using this general approach, a soft processor capable of operating on the soft information associated with variables of any number of possible states (not necessarily $2^N$) can be constructed by identifying a set of constraints that the variables (or a transformed version of the variables) satisfy, and by subsequently turning the constraints into a network of soft logical components (or in some examples, a network of soft and hard logical components). Such an approach can be applied to construct belief propagation processors that pass soft information of binary or m-ary variables between its structural elements. In a more general sense, the above approach can be used to construct a "soft" version of a digital processor whose operations are representable as a set of Boolean constraints.

2 "Compressed" Representation of Probability Distributions

Depending on the particular applications, there can be a variety of ways to form a "compressed" representation of the original probability distributions of m-ary (m≧2) variables. A simple example would be that, if a Gaussian distribution is quantized to 256 levels, then one can use the mean and variance (a total of two moments) of the quantized Gaussian to estimate the mean and variance of the original Gaussian distribution instead of using a histogram of 256 bins. If the quantization is good, then the two moments can be sufficient to characterize the original Gaussian. For other types of probability distributions not as simple as Gaussian distributions, one may still be able to find a relatively small set of moments to represent the distribution with fewer resources than just using a histogram naively.

Figure 2:
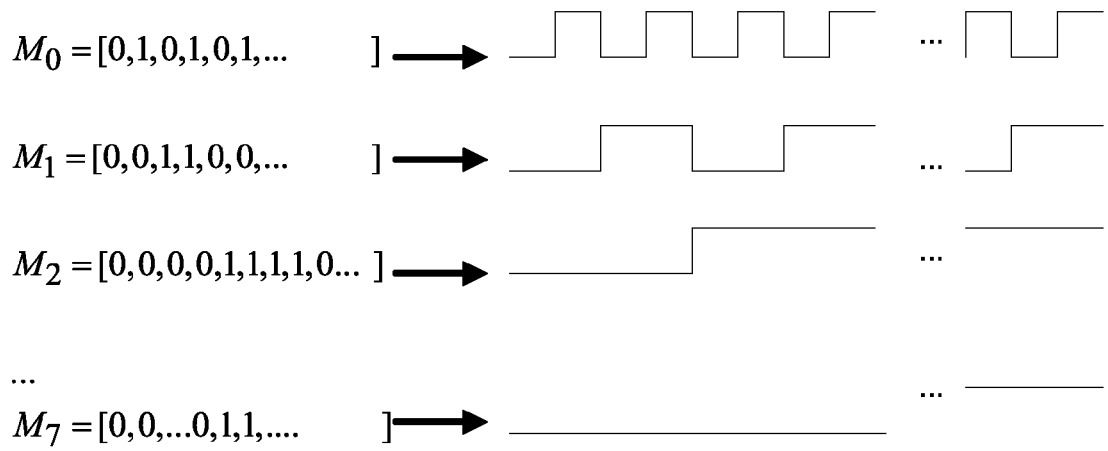
FIG. 2 illustrates an example of forming a compressed representation of the original probability distribution of a 256-state variable.

FIG. 2 shows one example of forming a compressed representation $\tilde{T}(x)$ to represent the probability distribution of a 256-state variable x. Here, each state of the variable x can be first represented by a corresponding 8-bit binary string of $[b_0, b_1, \ldots b_7]$ by applying a binary transformation T. The probabilities of each bit of the binary string being 1 together constitute a set of 8 moments, each generated by applying a corresponding row $M_i$ of a mask matrix M to the original probability distribution of x, as shown below:

$$\tilde{T}(x) = \begin{bmatrix} P(b_0=1) \\ P(b_1=1) \\ \vdots \\ P(b_7=1) \end{bmatrix} = \begin{bmatrix} M_0 \\ M_1 \\ \vdots \\ M_7 \end{bmatrix} \begin{bmatrix} P(x=x_0) \\ P(x=x_1) \\ \vdots \\ P(x=x_{255}) \end{bmatrix}$$

where $P(b_0=1)$ can be referred to the least significant soft bit, and $P(b_7=1)$ can be referred to as the most significant soft bit. In some applications, the term "soft bit" is associated with the marginal probability that a bit is 1 (or 0).

In this example, the binary string $[b_0, b_1, \ldots b_7]$ representing the variable x can be termed as a byte, and the resulting set of 8 moments $[P(b_0), P(b_1), \ldots, P(b_7)]$ can be termed as a soft byte. In this document, a byte generally refers to a sequence of bits (not necessarily a sequence of 8 bits), and a soft byte generally refers to a sequence of soft bits (or moments). A soft processor that operates on various soft bytes can be constructed using soft logic components representing the corresponding Boolean constraints, where each moment (or each soft bit) can be processed as a continuous-valued signal.

Note that the mask matrix M used in the above example is not the only matrix that can be used to derive a set of moments representing the original probability distribution. For instance, one may use a similar set of periodic functions where the period of each successive function in the set is twice that of the previous function. Another example is a Fourier-based transformation. Other examples include a wavelet-based transformation, a transformation formed by a set of vectors from the rows or columns of a Hadamard matrix of suitable size, etc. In some examples, the application of the lowest frequency component of a mask function leads to the most significant bit (MSB) of a variable, whereas the application of the highest frequency component of a mask function leads to the least significant bit (LSB) of the variable. Imagine that each soft bit is transmitted by a separate wire, with each wire bearing some degree of noise. The output of the processing may be more sensitive to the noise on the MSB wire than to the noise on other wires. To mitigate such effects, in some examples, the mask function can be designed to have a mix of frequency components each with a different weight, thereby preventing the noise associated with a particular frequency component from dominating the outcome of the processing.

In some examples, the general approach to forming compressed representations described above is applicable to probability distributions that are sufficiently "sparse." For certain sparse functions, a random mask may be sufficient to capture all of the information present in the function. In other words, the compressed representation, regardless of how it is derived, may provide a sufficient set of statistical information for the random variable in question.

In some applications, the choice of the representation described in FIG. 2 may be particularly useful, as it resembles a digital data structure but instead of using bits, now uses soft bits. Using soft bytes and soft words, one can build arrays of soft logic roughly analogous to digital logic with good performance. This approach can be further extended to form a soft version of any digital representation. For instance, one may form a soft two's complement representation, or even use a soft version of a floating point digital representation such as a "soft-double" or a "soft-float." For a floating point number having a sign bit, a significant, and an exponent, the soft-float can be represented using a combination of a soft sign bit, a soft significant, and a soft exponent. The soft exponent, for instance, includes a set of soft bits each representing a marginal probability of a corresponding hard bit in the exponent.

3 Applications

The following section gives examples of performing statistical inference using "soft bits" and "soft bytes."

Assume that a system has a set of variables whose solution satisfies a group of constraints. Certain statistical information about the variables is known (e.g., one may know a priori that there is a 70% chance that a certain variable is zero). Such information can be provided to a soft processor to infer the states of other variables.

For purpose of illustration, two examples are provided below.

3.1 Example 1—Magic Square

Consider the following 4×4 array of numbers:

TABLE 1

| 15 | 2  | 1  | 12 |
|----|----|----|----|
| 4  | 9  | 10 | 7  |
| 8  | 5  | 6  | 11 |
| 3  | 14 | 13 | 0  |

Notice that the sum of each column is 30, as is the sum of each row and each of the main diagonals. Generally speaking, if one fills an N×N grid with distinct integers from 0 to $N^2-1$ such that the rows, columns, and main diagonals all add up to the same value, the resulting grid is a type of magic square.

Assume one receives some statistical information about a magic square (e.g., a clue like "there is a 70% chance that the upper left entry is even") and wishes to find the most likely magic square that gives rise to those observations. This problem can be expressed in terms of constraints as follows.

3.1.1 Restatement of Constraints

Two types of constraints exist in a magic square problem. The first type includes logical constraints—each entry need to be distinct (i.e., no repeated entries). The second type includes numerical constraints—various collections of entries (each row, each column, and each main diagonal) all sum to the same value.

Table 2 shows a 4×4 magic square filled with variables $x_0$ through $x_{15}$. Since the valid states of each variable lie in the range of 0 to 15, each entry can be represented by a string of 4 binary bits. All the rows, columns, and main diagonals need to sum to 30.

TABLE 2

| $x_0$    | $x_1$    | $x_2$    | $x_3$    |
|----------|----------|----------|----------|
| $x_4$    | $x_5$    | $x_6$    | $x_7$    |
| $x_8$    | $x_9$    | $x_{10}$ | $x_{11}$ |
| $x_{12}$ | $x_{13}$ | $x_{14}$ | $x_{15}$ |

The constraints on these variables can be expressed below:

$$\forall\, p < q,\, x_p \neq x_q \quad (1)$$

$$\forall\, i,\, \sum_{j=0}^{3} x_{4i+j} = 30 \quad (2)$$

$$\forall\, j,\, \sum_{i=0}^{3} x_{4i+j} = 30 \quad (3)$$

$$\sum_{i=0}^{3} x_{5i} = 30 \quad (4)$$

$$\sum_{i=1}^{4} x_{3i} = 30 \quad (5)$$

In other words, variables $x_0, \ldots, x_{15}$ will form a magic square if and only if they satisfy the constraints above. As each variable can be represented as a string of 4 binary bits, these equality and non-equality constraints can be further expressed as restrictions on the individual bits of the variable using Boolean Logic.

In the following description, operator "+" represents addition over integers, operator "$\oplus$" represents mod-2 addition (which corresponds to an XOR operation), operator "$\wedge$" represents AND (logical conjuction), and operator "$\vee$" represents OR (logical disjuction).

Constraint #1: $x_p \neq x_q$ for all $p<q$.

To express this logical constraint, each variable can be first denoted as a sequence of 4 individual bits:

$$x_p = (a_p, b_p, c_p, d_p)$$

where $a_p$, $b_p$, $c_p$, $d_p$ are all binary bits.

Define a new variable $y = x_p \oplus x_q$ using bit-wise XORs, i.e.

$$y = (a_p \oplus a_q, b_p \oplus b_q, c_p \oplus c_q, d_p \oplus d_q)$$

Note that $x_p = x_q$ if and only if $y = (0,0,0,0)$. Therefore, $$x_p \neq x_q \text{ if and only if } (a_p \oplus a_q) \vee (b_p \oplus b_q) \vee (c_p \oplus c_q) \vee (d_p \oplus d_q) = 1$$

Constraints #2-5: $x_p + x_q + x_r + x_s = 30$ for any set of p,q,r,s values defined in Equations (2)-(5).

To express this numerical constraint, three new variables $x_{pq}, x_{rs}$, and $x_{pqrs}$ are introduced below:

$$x_p + x_q = x_{pq}$$

$$x_r + x_s = x_{rs}$$

$$x_{pq} + x_{rs} = x_{pqrs}$$

$$x_{pqrs} = 30$$

where each one of $x_p, x_q, x_r, x_s$ is a 4-bit string, each one of $x_{pq}, x_{rs}$ is a 5-bit string, and $x_{pqrs}$ is a 6-bit string.

As such, each four-term summation can be reduced to a set of summations of pairs of variables. Recall that by using a ripple adder, it is possible to add the bit representations of two variables using only $\vee$, $\wedge$ and $\oplus$ operations (i.e., OR, AND and XOR). Thus, constraints #2-5 can also be expressed using a set of Boolean logic functions.

As each constraint in this magic square problem is now expressed in terms of $\vee$, $\wedge$ and $\oplus$ operations, one can build a network of soft (e.g., probability-based) logic components representing these constraints, where believes (e.g., a priori information) about certain variables can be propagated throughout the network to generate estimates about the states of other variables. One way of implementing such a belief propagation technique using factor graph will be discussed in detail at a later section of this document.

3.1.2 Exemplary Magic Square Solver

Figure 5:
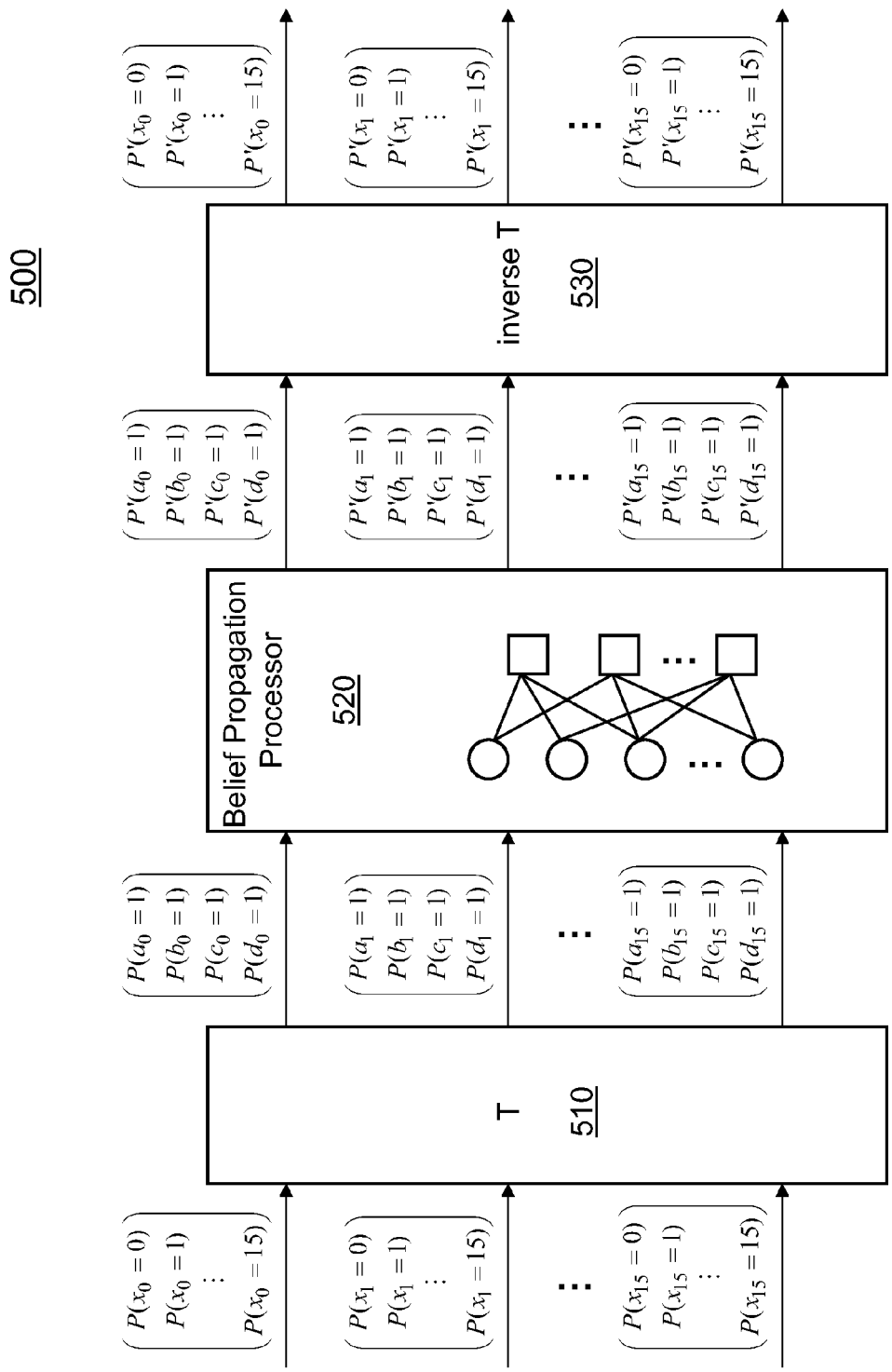
FIG. 5 is a block diagram of an exemplary soft processor for solving magic square problems.

FIG. 5 provides one example of a soft processor 500 configured for solving 4×4 magic square problems using some of the above-discussed techniques.

In this example, the soft processor 500 is an integrated circuit including three components: an input transformation circuit 510, a belief propagation processor 520, and an output transformation circuit 530.

The input transformation circuit 510 accepts input data specifying some or all of the 16 variables in the 4×4 magic square, such as prior knowledge for some or all $x_i$ (i=0, ..., 15) represented in the form of probability distributions. For instance, a clue saying that the top left entry (i.e., $x_0$) is 70% likely to be 0 may be reflected by a vector of probabilities such as $p(x_0) = [0.7, 0.02, 0.02, \ldots, 0.02]$, where the first element 0.7 corresponds to the probability of $x_0$ being 0, and each remaining element being 0.02 corresponds to the result of dividing the remaining 30% chance over 15 non-zero possible values (assuming no other information about $x_0$ is available).

On the other hand, if no clue is given for variable $x_1$, then one may use a vector of $$p(x_1) = \left[\frac{1}{16}, \frac{1}{16}, \frac{1}{16}, \cdots, \frac{1}{16}\right]$$

to provide an initial representation of the variable, which indicates that each one of the 16 states of the variable is equally likely.

The initial data specifying the variables (e.g., in the form of probability vectors) are transformed by the input transformation circuit 510, which implements a transformation T to generate a transformed (possibly compressed) representation further specifying the variables. One example of a transformed representation specifying a variable $x_i$ includes a vector of four moments (or four soft bits) [$p(a_i=1)$, $p(b_i=1)$, $p(c_i=1)$, $p(d_i=1)$], provided that the variable $x_i$ itself can be transformed to and reasonably represented as a string of four bits ($a_i, b_i, c_i, d_i$). Note that in some applications, it is not a requirement to provide all of the initial specifications of the full set of variables $x_0$ through $x_{15}$ to the input transformation circuit 510. For example, as the prior knowledge of certain variables may not be available, the initial specifications of those variables may be omitted, or generated by default.

The belief propagation processor 520 accepts the soft bits [$p(a_i=1)$, $p(b_i=1)$, $p(c_i=1)$, $p(d_i=1)$] (i=0, ..., 15) generated by the input transformation circuit 510 and processes those data in a network of constraints according to a belief probapation algorithm to generate estimates of the transformed variables that satisfy the constraints (e.g., constraints #1-5 as restated in the above section). In some examples, the network is configured using graph-based techniques and includes variable nodes and check nodes through which continuous-valued data (beliefs) are combined and updated iteratively according to the corresponding rules, for example, until the final beliefs converge. Further discussions of the belief propagation processor 520 is provided at a later section of this document.

The output of the belief propagation processor 520, for example, the final beliefs of the transformed variables, [$p'(a_i=1)$, $p'(b_i=1)$, $p'(c_i=1)$, $p'(d_i=1)$] for i=0, ..., 15, provides measures of a degree of association of each bit with binary value 1 or 0.

Those measures are provided to the output transformation circuit 530, which applies inverse of transformation T (or approximate inverse of transformation T) to determine measures of a degree of association of each original variable $x_i$ with its possible values 0 through 15.

The output of the output transformation circuit 530 can be further coupled to a decision module (not shown) to generate solutions to the magic square. For instance, based on the estimated probability distribution [$p'(x_i=0)$, $p'(x_i=1)$, ..., $p'(x_i=15)$] for a given variable $x_i$, the decision modules selects the variable value with the highest probability and uses it as the final solution to fill the $x_i$ block of the magic square.

In some examples, the decision module may be coupled directly to the belief propagation processor 520 for converting the processor's output (for example, the moments [$p'(a_i=1)$, $p'(b_i=1)$, $p'(c_i=1)$, $p'(d_i=1)$]) directly to hard bits. The hard bits are then converted to obtain the value that the variable will take. For example, if the output of belief propagation processor 520 for variable $x_i$ is [0.6, 0.2, 0.1, 0.8], one may determine that $x_0$ can be represented by a 4-bit string of (1, 0, 0, 1) (because a probability of less than 0.5 indicates that the bit is more likely to be a 0, and a probability of greater than 0.5 indicates that the bit is more likely to be a 1). Consequently, the 4-bit string is converted to a variable value of 9, which will be used as the final solution for $x_0$.

3.2 Example 2—Sudoku

Sudoku is another example where the problem can be restated as a set of Boolean constraints.

Typically, Sudoku consists of determining the values in a N×N grid. In the case of a 9×9 grid, each entry takes a number from 1 to 9. In each row and each column, each one of the 9 numbers appears exactly once. Additionally, the 9×9 grid is partitioned into nine disjoint 3×3 sub-grids, and each of the 9 numbers appears exactly once in each sub-grid.

Sudoku problems can be viewed as easier than magic square problems in the sense that there is no numerical constraint involved. In fact, only logical constraints exist: the entries in each row, each column, and each sub-grid are distinct.

Again, for the purpose of simplicity, the following example illustrates a modified Sudoku problem that takes numbers between 0 and 8 (by subtracting 1 from the standard entries). In one example, each of the 81 variables of a 9×9 Sudoku can be represented as a string of 4 binary bits.

In the following example, each variable in a Sudoku grid is represented as a string of 2 trinary (base-3) bits. Let $x \oplus_3 y$ be the base-3 component-wise sum of two trinary variables, i.e., if $x=(a_x, b_x)$ and $y=(a_y, b_y)$, then $$x \oplus_3 y = (a_x \oplus_3 a_y, b_x \oplus_3 b_y).$$

Here, $\oplus_3$ represents a mod-3 addition such that $1 \oplus_3 1=2$, $2 \oplus_3 2=1$, and so forth.

The constraints that the entries in each row, each column, and each grid need to be distinct mean that there will be 27 groups of 9 variables, and in each group, the 9 variables are all distinct. Take the first row of a Sudoku for example. Each entry of the row can be represented by a string of 2 trinary digits, for example, (0, 0), (0, 1), (0, 2), (1, 0), (1, 1), (1, 2), (2, 0), (2, 1), (2, 2). For the first two entries of the first row, e.g., denoted as x and y, the constraint on these two entices can be expressed in analogy with the binary case (as illustrated in the magic square problem), except for the use of a minus sign:

$$x \neq y \text{ if and only if } x \oplus_3 (-y) \neq (0, 0)$$

In other words, if x is represented as $x=(a_x, b_c)$, and y is represented as $y=(a_y, b_y)$, where a's and b's are all trinary digits, the constraint can be restated as:

$$a_x \oplus_3 (-b_x) \neq 0, \text{ and}$$

$$a_y \oplus_3 (-b_y) \neq 0$$

Using the same reduction for all other constraints, a solution that satisfies all the constraints is a valid Sudoku.

In the above magic square and Sudoku examples, once the problem has been reduced to a set of numerical and/or logical constraints, the solution of the problem can be found, for example, using belief propagation techniques as discussed immediately below.

3.3 Belief Propagation

As previously discussed, belief propagation relates to a message passing technique (or, more properly, a family of message passing techniques) that attempts to estimate, for instance, the marginal probabilities of the states of variables, by passing messages on a graph (e.g., a factor graph). A factor graph provides a network of nodes and edges that can encode the probabilistic and/or deterministic constraints of a system of equations. In some implementations, each variable is represented by a variable node and each constraint is represented by a check node (also referred to as a constraint node). Additionally, there exists an edge between a variable node and a check node if the variable appears in that constraint. Some general discussions of factor graph techniques are provided in "An Introduction to Factor Graphs," by H.-A. Loeliger, published in *IEEE Signal Proc. Mag*, January 2004, pp. 28-41, the content of which is incorporated herein by reference.

For purposes of illustration, suppose one has the following system of two equations acting on five binary variables:

$$x_1 \oplus x_2 \oplus x_3 = 0$$

$$x_1 \wedge x_4 = x_5$$

Figure 3:
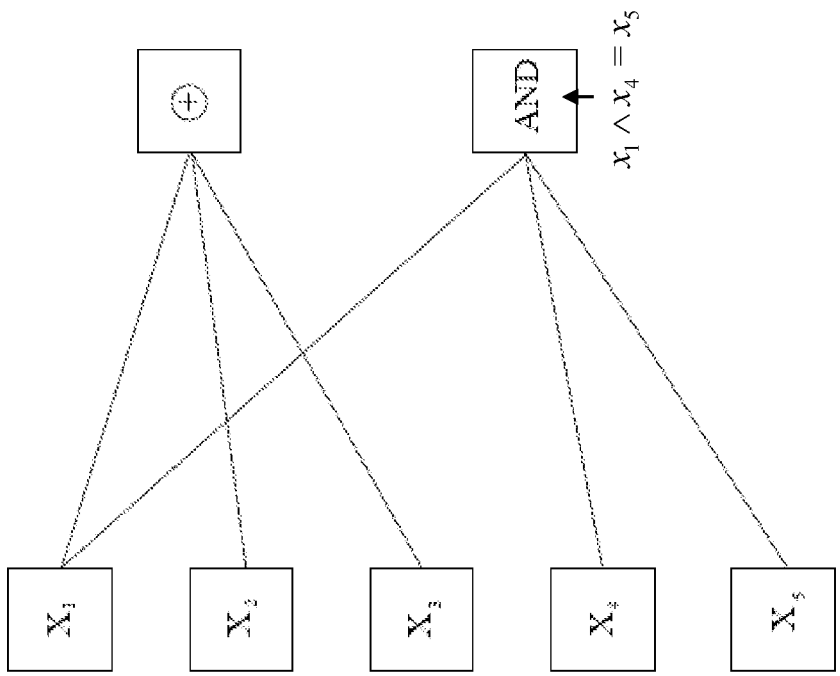
FIG. 3 illustrates an example of building a network of variable and check nodes that satisfies a set of two constraints.

One example of a factor graph representing this system includes a network of 5 variable nodes and 2 check nodes, as shown in FIG. 3.

In this graph, a "message" can be sent along every edge in both directions. It can be interpreted as the belief in each possible value (or state) for a variable. With binary variables, this is the belief that each of the five variables $(x_1, \ldots, x_5)$ is a 0 or a 1.

In some examples, solving a belief propagation problem starts with the knowledge of prior information about the probability of a bit being a zero or a one. Such knowledge can be represented in the factor graph by adding a "half-edge," i.e., an edge attached to only one node. A message entering on the half-edge conveys the prior information.

Figure 4:
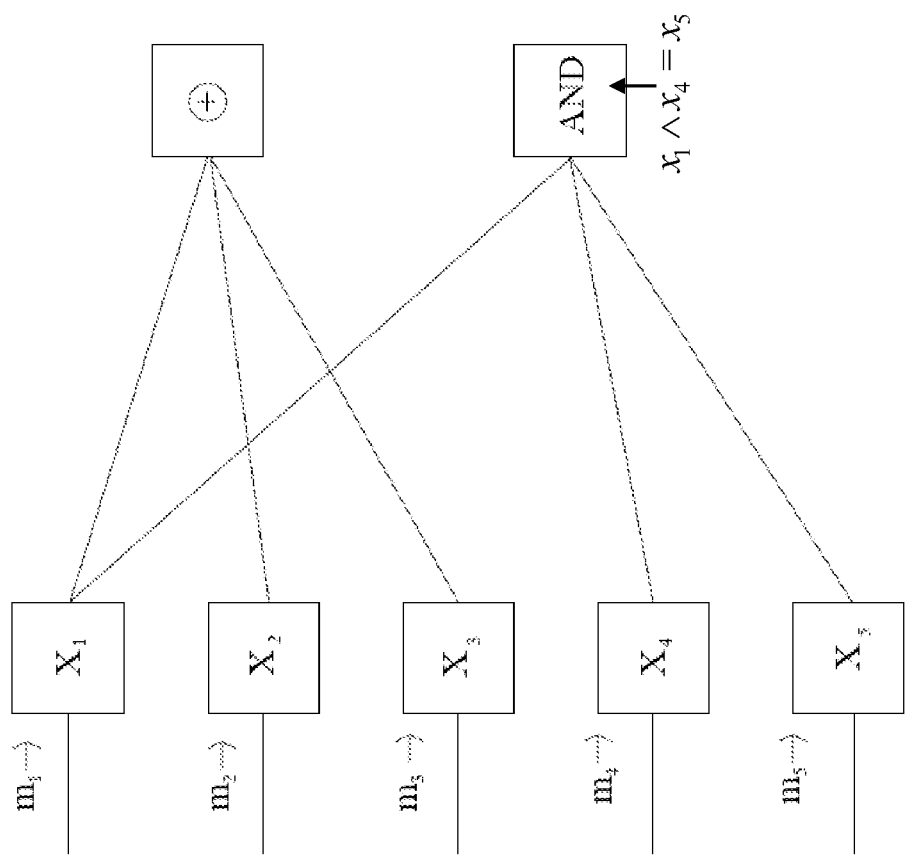
FIG. 4 illustrates an example of implementing belief propagation in the network of FIG. 3.

As shown in FIG. 4, assume that one is given prior information of the probability of each variable being "1," i.e., $p_i = \Pr(x_i=1)$, for $i=1, \ldots, 5$. Such priors can be sent as messages $m_1, \ldots, m_5$ along the half-edges toward the variable nodes. The belief propagation algorithm then passes messages around the network. For instance, the messages are collected at some nodes, which then combine them and send out new, updated messages towards other nodes.

In this five-variable example, the first constraint can be implemented by a 3-terminal soft XOR gate:

$$x_1 \oplus x_2 \oplus x_3 = 0$$

Note that this relation is satisfied in the following four situations:

| $x_1$ | $x_2$ | $x_3$ |
|---|---|---|
| 0 | 0 | 0 |
| 0 | 1 | 1 |
| 1 | 0 | 1 |
| 1 | 1 | 0 |

Suppose one receives messages showing the beliefs in $x_1$ and $x_2$, i.e., the probabilities $P(x_1=0), P(x_1=1), P(x_2=0), P(x_2=1)$ are known. Then the probabilities of the third variable $x_3$ can be calculated as follows:

$$P(x_3=0) = P(x_1=0)P(x_2=0) + P(x_1=1)P(x_2=1)$$

$$P(x_3=1) = P(x_1=0)P(x_2=1) + P(x_1=1)P(x_2=0)$$

Thus, for this 3-terminal XOR gate, the message exiting the gate (e.g., $P(x_3=1)$) can be calculated using the two messages entering the gate (e.g., $P(x_1=1)$, $P(x_2=1)$).

Similarly, for the soft AND gate implementing the second constraint:

$$x_1 \wedge x_4 = x_5,$$

the relation of the messages is satisfied in the following four situations:

| $x_1$ | $x_4$ | $x_5$ |
|---|---|---|
| 0 | 0 | 0 |
| 0 | 1 | 0 |
| 1 | 0 | 0 |
| 1 | 1 | 1 |

If $P(x_1=0), P(x_1=1), P(x_5=0), P(x_5=1)$ are known, then the outgoing message to node $x_4$ can be calculated as $$Pr(x_4 = 0) = \frac{P(x_1 = 0)P(x_5 = 0) + P(x_1 = 1)P(x_5 = 0)}{C}$$

$$Pr(x_4 = 1) = \frac{P(x_1 = 0)P(x_5 = 0) + P(x_1 = 1)P(x_5 = 1)}{C}$$

where the normalization term C is defined as $$C = 2P(x_1=0)P(x_5=0) + P(x_1=1)P(x_5=0) + P(x_1=1)P(x_5=1)$$

Similarly, if $P(x_4=0), P(x_4=1), P(x_5=0), P(x_5=1)$ are known, the outgoing message that represents the marginal probability of $x_1$ can be obtained as:

$$Pr(x_1 = 0) = \frac{P(x_4 = 0)P(x_5 = 0) + P(x_4 = 1)P(x_5 = 0)}{C'}$$

$$Pr(x_1 = 1) = \frac{P(x_4 = 0)P(x_5 = 0) + P(x_4 = 1)P(x_5 = 1)}{C'}$$

where the normalization term C' is defined as $$C' = 2P(x_4=0)P(x_5=0) + P(x_4=1)P(x_5=0) + P(x_4=1)P(x_5=1)$$

Other edges in the soft AND and the soft XOR behave similarly. By applying these update rules iteratively to the graph, for example, until (hopefully) the beliefs converge, the final believes can be treated as approximations to the marginal probabilities of the variables. In the case where the factor graph is a tree, this approximation can be exact.

4 Alternative Embodiments and Extensions

Note that in this document, the term "bit" is not necessarily limited to a binary digit. In some examples, it can be used to generally refer to a m-ary digit, where $m \geq 2$. Similarly, the term "soft bit" is not necessarily limited to the probabilistic information of a binary digit, but more generally, can be used to refer to the probabilistic information of a m-ary digit, where $m \geq 2$. Furthermore, for the case that $m>2$, two or more analog signals are used to pass the belief that the m-ary bit takes on various of the m values. For example, $m-1$ analog signals may be used to represent the soft information for an m-ary bit.

Also, in the example of FIG. 1, to compute a set of soft bits in relation to the original set of mult-state variables, instead of transforming the variables first to string of binary bits, an alternative approach is to transform the variables first to string of m-ary bits (e.g., trinary bits as illustrated in the above Sudoku example), and to subsequently determine the soft trinary bits to be processed in the soft processor.

Another application relates to using a small set of moments representing the original probability distribution of a multi-state variable to reconstruct quantities like the mean and variance of the original probability distribution, as discussed below.

4.1 Higher Bit Moments

Suppose one has a probability distribution of a variable that assumes a value from a finite subset of the integers, for example, 0 through 255. The probability distribution can be expressed as a list of 256 numbers, with each number being in the range of [0, 1]. When this distribution is compressed into a set of 8 moments (i.e., 8 soft bits), only 8 numbers need to be stored. The performance of using such moments can be evaluated, for example, by reconstructing the maximum entropy distribution consistent with these moments and assessing the result of the reconstruction.

In some particular examples, the use of the above 8 moments may not always be sufficient to exactly reconstruct the original probability distribution. For instance, assume that a variable has a sampled Gaussian distribution over 256 possible values with a mean of 127.5. Then each of the 8 moments determined using binary decomposition is exactly ½, and the standard deviation works out to be 73.9. However, using these 8 moments, the standard deviation of the reconstructed probability distribution will always be 73.9 regardless of the input variance. In such cases where the set of 8 moments are not sufficient to describe the original probability distribution, higher moments (e.g., $2^{rd}$ order moments) may be desired.

For example, if one views the "true" distribution as the distribution over the $2^N$ states (i.e. view it as a discrete distribution rather than a continuous one), then the mean of the distribution can be reconstructed exactly using a first set of moments $\tilde{M}(i)$ shown below. (Not just for sampled Gaussians; this holds for other discrete distributions.)

Let $\mu$ be the mean of the distribution, and define, for any integer x between 1 and $2^N$, $b_i(x)$=value of the i-th bit of x, and $p(x)$ is the probability of the integer x. Then $$\mu = \sum_{x=1}^{2^N} x p(x)$$

$$= \sum_{x=1}^{2^N} \left( \sum_{i=1}^{N} b_i(x) 2^i \right) p(x)$$

$$= \sum_{i=1}^{N} 2^i \sum_{x=1}^{2^N} b_i(x) p(x)$$

The moment $\tilde{M}(i)$ for bit i is the sum of the probabilities of all values with a "1" in the i-th bit, so we are given $$\tilde{M}(i) = \sum_{x=1}^{2^N} b_i(x) p(x)$$

and hence $$\mu = \sum_{i=1}^{N} 2^i \tilde{M}(i)$$

Thus, given moments $\tilde{M}(i)$ with $i=1, \ldots, N$, the mean of the discrete distribution can be recovered exactly.

Next, let $\sigma^2$ be the variance of the probability distribution. One can obtain the following equations:

$$\sigma^2 + \mu^2 = \sum_{x=1}^{2^N} x^2 p(x)$$

$$= \sum_{x=1}^{2^N} \left( \sum_{i=1}^{2N} b_i(x^2) 2^i \right) p(x)$$

$$= \sum_{i=1}^{2N} 2^i \sum_{x=1}^{2^N} b_i(x) p(x)$$

Define a set of second order moments $\tilde{V}(i)$ as follows, for $i=1, \ldots, 2N$:

$$\tilde{V}(i) = \sum_{x=1}^{2^N} b_i(x^2) p(x)$$

Based on the second order moments, the variance can be recovered as:

$$\sigma^2 = \left[ \sum_{i=1}^{2N} 2^i V(i) \right] - \mu^2,$$

which corresponds to the exact variance (or the square of standard deviation) of the original distribution.

Therefore, one can use the combination of $\tilde{M}(i)$ and $\tilde{V}(i)$, i.e., a total of 3N moments (i.e., N+2N) to accurately recover the mean and the variance of the original distribution.

In this example, to recover the mean, the N moments of $\tilde{M}(i)$ are sufficient. To recover the variance, an additional set of 2N moments of $\tilde{V}(i)$ is used. Generally, to recover $1^{st}$ through k-th order cumulant or moment of the distribution, one can use $$\frac{(k+1) \cdot k}{2} N$$

moments, where the value of each moment falls in the range of [0,1].

Some of the moments used above may be redundant. The redundancy can be found, for example, by examining the bit structure of the perfect squares. For instance, the parity of the low order bit alternates, hence $\tilde{V}(1) = \tilde{M}(1)$ Also, based on the nature of modular arithmetics, the second lowest order bit of a perfect square is always zero, so $\tilde{V}(2) = 0$ Therefore, it is not required to calculate or store $\tilde{V}(1)$ or $\tilde{V}(2)$.

Note that although in many of the examples shown above, the variables being processed by a soft processor appear to have the same number of variable levels (e.g., x, y, z all having $2^N$ possible levels as shown in FIGS. 1A-1C), this need not to be the case in other examples. For instance, a soft processor may operate on a set of variables having different numbers of variable levels and for each variable, still form a transformed representation of its original probability distribution. Similarly, the transformed representations of different variables may not necessarily include the same number of soft bits. For instance, one may have 3 soft bits whereas another may have 5 soft bits. Further, in a more general case, the input variables to the belief propagation processor 520 shown in FIG. 5 may not have the same number of soft bits as the output variables. Or the belief propagation processor 520 may include intermediate variables that are computed based on its input variables but having different number of soft bits. For instance, it may be useful to compute an intermediate variable corresponding to the summation of two 3-bit variables, in which case the intermediate variables may be a 4-bit variable and therefore need an additional soft bit as compared with the input variables.

In the above description, various techniques are provided for implementing statistical inference techniques in the analog domain to operate on variables having any finite number of states. Soft information can be represented using continuous-valued signals (e.g., current or voltage signals) and be processed in a soft processor. It should be noted in some other implementations of the statistical inference techniques, soft information may be represented and processed in alternative forms.

One example makes use of stochastic computing techniques, in which case soft information, or sometimes continuous-valued quantities, can be represented by a stochastic bit stream. For instance, by introducing random (or pseudo random) dithering between two levels of 0 and 1, a quantity of 0.8 can be represented by a string of bits that overall has 80% of 1's and 20% of 0's. Accordingly, a soft bit or moment having a value between 0 and 1 can be represented by a "dithered" signal having a duty cycle (the percentage of times that the signal is 1) equal to the value of the soft bit. Correspondingly, the belief propagation processor 520 can be modified to process dithered signals rather than continuous-valued voltage or current signals as described in the early sections of this document.

4.2 Inter-symbol Interference (ISI) Equalizers

Another application of the general approaches described above relates to equalizers that deal with the inter-symbol interference (ISI) that may affect communication channels.

Suppose that a channel suffers from ISI with fixed impulse response $c_1, \ldots, c_m$. If one transmits signals $x_1, \ldots, x_n \in R$, for $n \geq m$, then at time t the received signal would be:

$$\sum_{i=1}^{m} c_i x_{m+t+1-i}$$

(This would also work with complex inputs; for purposes of illustration, the description here focuses on real inputs.)

Assume that the channel also suffers from noise, for example, at time t the noise is $n_t$, an i.i.d. Gaussian random variable with mean 0 and variance $\sigma^2$. Therefore, the actual received signal would be:

$$y_t = n_t + \sum_{i=1}^{m} c_i x_{m+t+1-i}$$

Here, also assume that the transmitted signals $x_i$ are either +1 or −1 (i.e. BPSK-encoded bits).

From the discussion in the "Magic Square" example, one can construct a "soft adder," for example, given two s-bit inputs α and β consisting of uncertain bits, one can calculate the soft summand γ by decomposing the operation into a collection of individual soft gates. Similarly, one can build a "soft subtractor" by using the soft adder and specifying γ and α and by running belief propagation to generate β.

Note that, in the above description, the illustrations are made based on the assumption that α and β are non-negative in the "soft adder." There are several ways to extend the techniques to negative variables. One method, for example, is to extend all the inputs and outputs by several bits and add $2^{s'}$ to each of the inputs and $2^{s'+1}$ to the output, for $s' \geq s$. One can then represent $\alpha, \beta \in [-2^s, 2^s-1]$ as positive numbers. (This is variant of what is usually called "two's-complement" arithmetic.) This technique also allows one to handle subtraction with negative quantities.

Accordingly, the current estimates of the $x_i$ can be used to estimate the ISI-garbled version of the $y_i$, as belows:

$$\tilde{y}_t = \sum_{i=1}^{m} c_i [Pr(x_{m+t+1-i} = 1) - Pr(x_{m+t+1-i} = -1)]$$

One can then calculate $$\tilde{n}_t = y_t - \tilde{y}_t$$

Next, we compute the probability of observing $y_t$ assuming that the transmitted signal was $\tilde{y}_t$, which is $$(1/\sigma\sqrt{2\pi})e^{-\tilde{n}_t^2/2\sigma^2}$$

where the probability is represented as a collection of soft bits.

To implement this computation, a soft multiplier may be used. This can be built analogously with the soft adder. As with the soft adder, there are various ways of handling negative numbers; a similar technique of padding extra high bits works, although more extra bits may be needed. As with the soft subtractor, one can produce a soft divider by using a soft multiplier backwards.

Using such techniques, one can now take any target function, perform a Taylor expansion, and express it approximately as a polynomial. Polynomials are computable using multiplication and addition of (positive and negative) numbers. In particular, we can compute the functional form above for the probability of observing $y_t$. We can calculate $x_i$ in terms of the other $x_j$, and can convert the soft bits back to probabilities simply by summing them. Therefore, belief propagation can be applied to perform ISI equalization.

Note that in the above example, the input stream $x_1, x_2, \ldots$ is treated as unencoded.

In practice, the input stream may be encoded, for example, with a convolutional code. Adding the constraints of a convolutional code to the factor graph can be implemented, for example, by adding another check node for each check equation and connecting it to equals node for each corresponding $x_i$.

It is to be understood that the foregoing description is intended to illustrate and not to limit the scope of the invention, which is defined by the scope of the appended claims. Other embodiments are within the scope of the following claims.

What is claimed is:

1. A method comprising:
   accepting a specification of a plurality of variables, each variable having a set of at least N possible values, wherein the plurality of variables satisfy a set of one or more constraints, and each variable is specified as a decomposition into a plurality of constituents with each constituent having a set of M possible constituent values that can be determined based on the variable values;

forming a specification for configuring a computing device that implements a network representation of the constraints based on the specification of the plurality of variables, wherein the network representation includes a first set of nodes corresponding to the pluralities of constituents, a second set of nodes corresponding to the set of constraints, and interconnections between the first and the second sets of nodes for passing continuous-valued data; and wherein the computing device configured according to said specification is operable to:

accept a first set of quantities each characterizing a degree of association of one constituent of one of the plurality of variables with one of the M possible constituent values; and determine a second set of quantities each characterizing a degree of association of one constituent of one of the plurality of variables with one of the M possible constituent values by passing the first set of quantities and intermediate data along the interconnections in the network representation.

2. The method of claim 1, wherein said specification for the computing device includes an analog circuit specification.

3. The method of claim 2, wherein said analog circuit specification includes a discrete-time analog circuit specification.

4. The method of claim 1, wherein said specification for the computing device includes software instructions for execution on a processor.

5. The method of claim 1, wherein the set of constraints includes a first set of arithmetic constraints.

6. The method of claim 1, wherein the set of constraints includes a second set of logical constraints.

7. The method of claim 1, wherein the specification of the plurality of variables represents a compressed representation of a first specification of the plurality of variables.

8. The method of claim 1, wherein the N is greater than M.

9. The method of claim 1, further comprising forming the specification of the plurality of variables each as a decomposition into a plurality of constituents based on a first specification of the plurality of variables.

10. The method of claim 9, wherein the first specification of the plurality of variables includes a probability distribution representation of the plurality of variables.

11. The method of claim 10, wherein forming the specification of the plurality of variables each as a decomposition into a plurality of constituents includes:

applying binary decomposition to the probability distribution representation of the plurality of variables.

12. The method of claim 10, wherein forming the specification of the plurality of variables each as a decomposition into a plurality of constituents includes:

applying a Fourier transform to the probability distribution representation of the plurality of variables.

13. The method of claim 10, wherein the probability distribution representation of the plurality of variables includes quantities characterizing a degree of association of each one of at least some of the variables with the one or more of the at least N possible values.

14. The method of claim 1, wherein the degree of association of one constituent of one of the plurality of variables with one of the M possible constituent values is represented in the probability domain.

15. The method of claim 1, wherein the degree of association of one constituent of one of the plurality of variables with one of the M possible constituent values is represented in the logarithmic domain.

16. A method comprising:

accepting a first set of quantities, each associated with one of M possible constituent values of a constituent of one of a plurality of input variables, each variable having a set of at least N possible values;

providing signals representing the first set of quantities to computing circuitry implementing a network representation of a set of constraints on the input variables, the network representation including a first set of nodes each corresponding to one of a plurality of constituents of a respective input variable, a second set of nodes corresponding to the set of constraints, and interconnections between the first and the second sets of nodes for passing continuous-valued data;

accepting, from the computing circuitry, signals representing a second set of quantities, each associated with one of M possible constituent values of a constituent of one input variable.

17. The method of claim 16, further comprising:

determining the first set of quantities from a first specification of the plurality of input variables, the first specification including quantities characterizing a degree of association of each of at least some input variables with a different one of the at least N possible values.

18. The method of claim 16, further comprising:

according to the signals representing the second quantities, generating a set of output signals, each representing a degree of association of one of the plurality of input variables with a corresponding one of the at least N possible values.

19. The method of claim 16, wherein the computing circuitry includes analog circuits.

20. The method of claim 19, wherein the analog circuits include a clocked analog circuit.

21. The method of claim 20, wherein the clocked analog circuit includes soft logic gates for processing continuous-valued signals.

22. The method of claim 21, wherein the soft logic gates include one or more of soft Equal gates, soft XOR gates, soft AND gates, soft OR gates.

23. The method of claim 16, wherein the computing circuitry includes a processor configured by software instructions.

24. A computing device comprising:

computing circuitry for applying a network representation of a set of constraints on a plurality of input variables, each input variable having a set of at least N possible values, wherein the network representation includes a first set of nodes each corresponding to one of a plurality of constituents of a respective input variable, a second set of nodes corresponding to the set of constraints, and interconnections between the first and the second sets of nodes for passing data;

an input processor for forming signals representing a first set of quantities, each quantity being associated with one of M possible constituent values of a constituent of one input variable, and for providing the formed signals to the computing circuitry; and an output processor for accepting signals generated by the computing circuitry representing a second set of quantities, each quantity being associated with one of the M possible constituent values of a constituent of one input variable.

25. The computing device of claim 24, wherein the computing circuitry is configured according to the network representation.

26. The computing device of claim 24, wherein the computing circuitry is configurable according to the network representation.

27. The computing device of claim 26, wherein the computing circuitry is operable to:
   accept a specification of the network representation of the set of constraints; and
   configure the circuitry to implement the network representation of the set of constraints according to the specification of the network representation.

* * * * *